(12) United States Patent
Istre, Jr.

(10) Patent No.: US 7,128,091 B2
(45) Date of Patent: Oct. 31, 2006

(54) SEXLESS COUPLING FOR FIRE HYDRANT-FIRE HOSE CONNECTION

(75) Inventor: Roy Istre, Jr., Irving, TX (US)

(73) Assignee: Hydra_Shield Manufacturing, Inc., Irving, TX (US)

(*) Notice: Subject to any disclaimer, the term of this patent is extended or adjusted under 35 U.S.C. 154(b) by 275 days.

(21) Appl. No.: 10/669,331

(22) Filed: Sep. 25, 2003

(65) Prior Publication Data

US 2005/0067022 A1    Mar. 31, 2005

(51) Int. Cl.
*F16K 15/03* (2006.01)
*F16L 55/00* (2006.01)

(52) U.S. Cl. .............. 137/515.5; 137/512.1; 285/73; 285/148.19

(58) Field of Classification Search ........... 137/299, 137/512.1, 515.5; 285/73, 148.19, 336, 376
See application file for complete search history.

(56) References Cited

U.S. PATENT DOCUMENTS

| | | | | |
|---|---|---|---|---|
| 489,107 A | * | 1/1893 | Storz | 285/73 |
| 3,007,488 A | * | 11/1961 | Wheeler, Jr. | 137/512.1 |
| 3,638,907 A | | 2/1972 | Graham et al. | |
| 4,523,778 A | * | 6/1985 | Ebert | 285/73 |
| 4,602,654 A | | 7/1986 | Stehling et al. | |
| 6,102,444 A | * | 8/2000 | Kozey | 285/376 |
| 6,102,450 A | * | 8/2000 | Harcourt | 285/73 |
| 6,447,027 B1 | * | 9/2002 | Lilley et al. | 285/148.19 |
| 6,450,542 B1 | * | 9/2002 | McCue | 285/148.19 |
| 6,733,045 B1 | * | 5/2004 | Harrington et al. | 285/148.19 |

* cited by examiner

*Primary Examiner*—John Rivell
(74) *Attorney, Agent, or Firm*—Millen, White, Zelano & Branigan, P.C.

(57) ABSTRACT

A sexless coupling for coupling a fire hose to the externally threaded neck of a fire hydrant. The coupling comprises an internally threaded collar portion for threading onto the neck of the fire hydrant, the internally threaded collar portion having a flapper valve and an externally threaded portion. The coupling further comprises an external ring having an internal thread for threading the external ring onto the externally threaded portion of the collar. The external ring carries hooked lugs for forming a male connection and arcuate grooves for forming a female connection with a complementary coupling of a fire hose. In accordance with one embodiment of the invention, a flat neoprene rubber seal is disposed between facing surfaces on the internally threaded collar and external ring. In accordance with another embodiment of the invention, an annular ring of sealing material is disposed in a groove in the external ring and seals against the collar portion adjacent to the threads when the collar and external ring are assembled.

10 Claims, 6 Drawing Sheets

SEXLESS COUPLING FOR FIRE HYDRANT-FIRE HOSE CONNECTION

FIELD OF THE INVENTION

The present invention relates to sexless couplings for fire hydrant-fire hose connections. More particularly, the present invention relates to couplings generally known in the art as "Storz connectors" which are used because they enable, rapid and accurate connections between fire hoses and fire hydrants.

BACKGROUND OF THE INVENTION

Generally, fire hoses from a fire truck are connected to a hydrant by a unfastenting a cap from the mouth of the fire hydrant and fastening the hose thereto, or if a cap or cover is not positioned on the fire hydrant, merely fastening the end of the hose to the hydrant. Thereafter, the hose is tightly secured to the fire hydrant so as to withstand the high water pressure flowing through the connection between the fire hydrant and fire hose.

It is important that the connection between the fire hose and fire hydrant be made quickly and efficiently in that the amount of water which can be directed on a fire during the first two to five minutes after fire-fighting equipment reaches the scene of a fire is major factor with respect to how quickly the fire can be brought under control. Quick response helps limit fire damage even before the fire is extinguished. With most prior art methods of connecting fire hoses to a fire hydrant, the first tow to five minutes after such equipment arrives at the scene of the fire are spent attempting to connect the hose with the hydrant which results in delays that frequently result in several thousand dollars of additional fire damage.

In a attempt to minimize the delay, many fire companies use a quick-coupling apparatus such as that set forth in U.S. Pat. No. 3,638,907, wherein a female member attached to the hose is thrust over a male member on the neck of the fire hydrant and quickly clamped in place. While this apparatus is effective and saves considerable time, it is heavy and relatively expensive.

Many fire companies are now utilize in their fire engines another type of coupling known as the "Storz Connector," which is a rotating coupling utilizing lugs that interlock with grooves. Storz Connector are known as a sexless couplings because each connector include both male and female coupling elements.

Very high water pressures now may be applied to fire hydrants and it is necessary that couplings operate at pressures as high as 400 psi. Water escaping from couplings under high pressure can injure fire fighting personnel because the water can form as discrete high speed steams. Due to their relatively complex structure, Storz Connectors provide pathways for leaks. In order to meet current standards, there is a need to configure Storz Connectors so as to minimize the likelihood of leaks at high water pressures.

SUMMARY OF THE INVENTION

In view of the aforementioned considerations, the present invention relates to a sexless coupling member providing a connection to couple a fire hose to a fire hydrant or other pressurized source of water. The sexless coupling comprises an internally threaded collar portion disposed about an axis and having a first end section and a second end section, the first end section being adapted to receive an externally threaded neck of a fire hydrant outlet. A valve support portion is disposed at the second end section of the internally threaded collar, the valve support poriton having a radially extending, annular surface facing the first end of the internally threaded collar and having an opening therethrough. A gasket is seated against the radially extending annular surface and is adapted to seal with the externally threaded neck of the fire hydrant outlet. A flapper valve is supported on a pintle extending across the opening through the radially extended annular surface. Unitary with the internally threaded collar and aligned with the opening through the radially extending annular surface is an internal ring portion with an external thread. The internal ring portion has a pair of opposed bores therein for receiving the pintle which supports the flapper valve. The bores are sealed adjacent to the external thread to prevent water from passing around the pintles and through the holes to locations beyond the external threads. An external ring, separate from the collar poriotn, has a first portion with an internal thread for threading with the external thread of the internal ring to hold the external ring in integral relations with the externally threaded collar. The external ring has at least one through bore extending therethrough for receiving a locking pin, which through bore is aligned with at least one blind second bore in the internal ring to prevent rotation of the external ring with respect to the internal ring after threading the external ring onto the internal ring. The at least one blind bore in the internal ring portion has a bottom which prevents pressurized water within the coupling from escaping therefrom through to the external ring. Locking lugs extend axially from the external ring and arcuate grooves are disposed between the internal ring portion and external rings with the locking lugs and arcuate grooves being adapted to cooperate with a complementary sexless coupling on a hose.

In a further aspect of the invention, the sexless coupling further comprises stiffener extending across the opening upstream of an aligned width the pintle.

In still a further aspect of the invention, the sexless coupling includes an additional second blind bore in the internal ring portion and an additional through bore in the external ring aligned with the additional second blind bore in the internal ring for receiving an additional locking pin.

In a further aspect of the invention, the bores in the internal ring receiving the pintle are not aligned with the through bores and blind bores receiving the pins for locking the external ring against rotation with respect to the internal ring.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
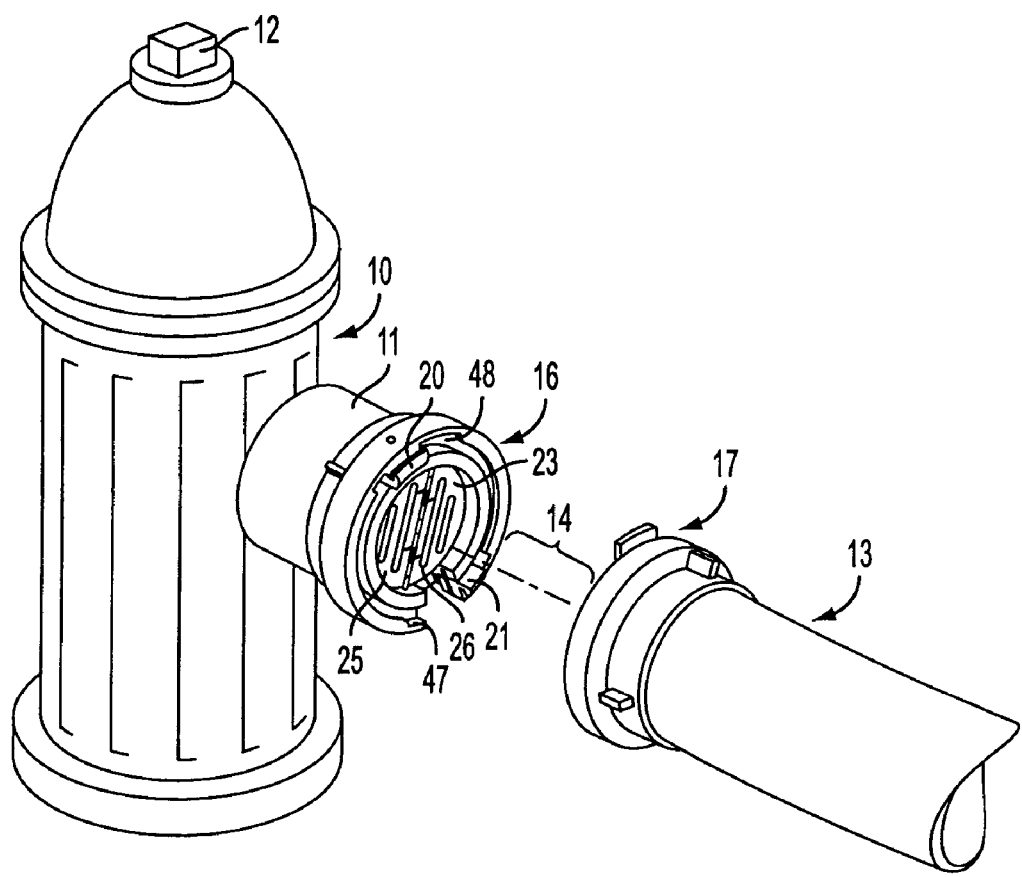
FIG. 1 is a perspective view, partially in section of a fire hydrant and fire hose, wherein a sexless coupling in accordance with the present invention is mounted on the outlet of the fire hydrant.

Referring now to FIG. 1, there is shown a fire hydrant, designated generally by the numeral 10, which has a laterally extending neck portion 11 having a mouth therein (not shown) which communicates with the interior of the fire hydrant and provides an outlet for water from the hydrant. Typically, in operation, the fire hydrant 10 has a valve therein which is opened by turning an operating nut 12. Pressurized water then flows into the hydrant 10, through the neck 11 and out of the mouth.

Typically, a hose, designated generally by the numeral 13, is dismounted from a fire truck, or perhaps a fire station, and is coupled to the neck 11 of the fire hydrant 10. In accordance with the principles of the instant invention, this coupling is effected by a "Storz connector," designated generally by the numeral 14. The Storz connector 14 is "sexless" and has first and second coupling members, designated generally by the numerals 16 and 17, respectively. The coupling member 16 is attached to the neck 11 of the hydrant 10 while the second coupling member 17 is connected to the hose 13. Generally, the coupling member 16 is retrofitted on the neck 11 and is a permanent installation. The second coupling on the hose 13 is permanently mounted thereon and usually provided with the hose 13 when the hose is purchased.

As is seen in FIG. 1, the first coupling member 16 has a pair of locking lugs 20 and 21 projecting therefrom. As will be further explained hereinafter, the locking lugs 20 and 21 cooperate with grooves in the second coupling member 17. Moreover, in order to protect the interior of the hydrant 10 from vandalism, the coupling member 16 is provided with a butterfly valve, designated generally by the numeral 23. As will be further explained hereinafter, the butterfly valve has two flaps 25 and 26 which are biased shut toward the interior of the fire hydrant 10. When the hydrant 10 is pressurized by opening the valve therein upon rotating the operating nut 12, water pressure within the hydrant forces the flaps 25 and 26 to open against their bias and allow water within the hydrant 10 to flow from the neck 11 into an attached hose 13. In addition to protecting the interior of the hydrant, it is desirable to protect the lug 20 and 21 and groove 47 and 48 area of the coupling member 16 from severe climatic conditions such as snow or ice build-up or sand, dust and grit.

Figure 2:
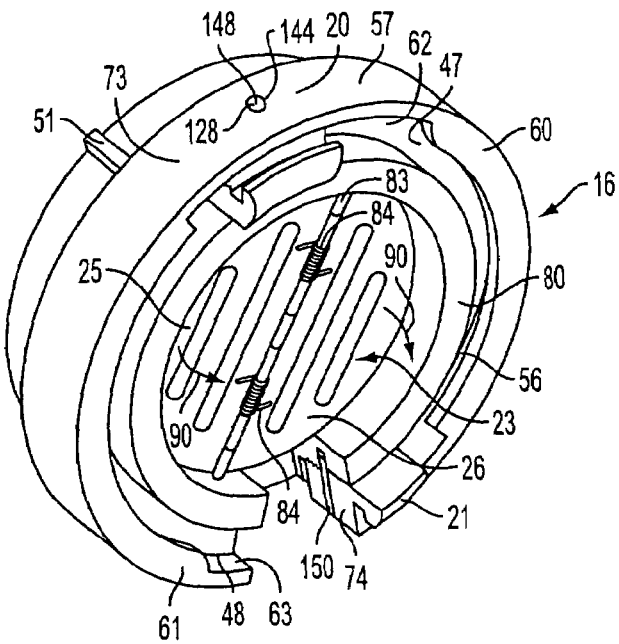
FIG. 2 is a perspective view, partially in section, of a first embodiment of the sexless coupling used with the fire hydrant of FIG. 1.
Figure 3:
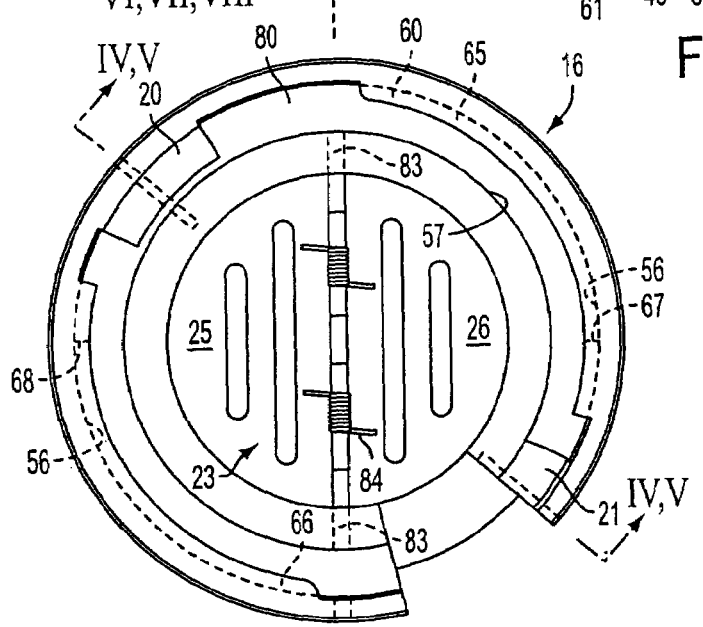
FIG. 3 is a front view, partially in section, of the coupling of FIG. 2.
Figure 4:
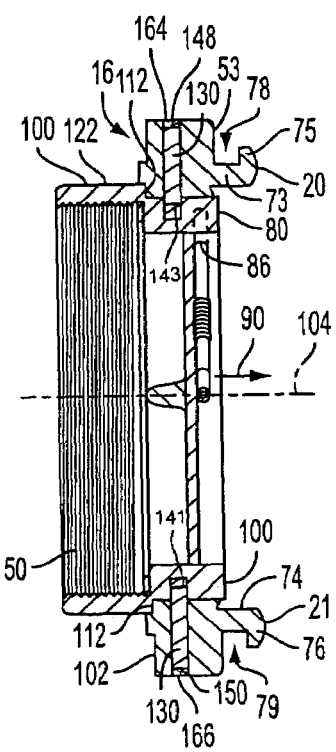
FIG. 4 is an elevation view taken along lines IV—IV of FIG. 3.

Referring now more specifically to FIGS. 2, 3 and 4, wherein a first embodiment 16 of the first coupling member is shown, it is seen that the first coupling member 16 has an internally threaded collar 50 which is screwed onto the neck 11 of the fire hydrant 10. The first coupling member 16 has a diameter of about 5 inches. Many fire hydrants 10 have a standard 5 inch threaded portion on the neck 11 thereof, adjacent the outlet opening. Consequently, the first coupling member 16 can be conveniently retrofitted on these fire hydrants. In order to mount the first coupling member 16 semipermanently on the neck portion 11, the internally threaded collars 50 have externally projecting radial lugs 51, which may be readily gripped with a large wrench or hit with a hammer in order to tighten the first coupling member onto the neck.

Just in front of the internally threaded collar 50 there is one-half of a Storz-type coupling, wherein a pair of opposed lugs 20 and 21 project from a substantially planner end portion 53 of the first coupling member 16. Adjacent and disposed clockwise to the lugs 20 and 21 are the substantially identical grooves 47 and 48. The substantially identical grooves 47 and 48 are formed in the first coupling member 16 between an outer wall 56 and inner wall 57. Overlying the slots 47 and 48 are lips 60 and 61 which are spaced from the lugs 20 and 21 by a distance equal to the circumferential length of the lugs to form inlet openings 62 and 63, respectively. The lips 60 and 61 have internal ramp surfaces 65 and 66 which are inclined in the clockwise direction so that the thickness of the flanges 60 and 61 increases from the recesses 62 and 63 in the clockwise direction with respect to FIG. 2. At the clockwise end of the lips 60 and 61 there are abutments 67 and 68, respectively.

As is best seen in FIG. 4, the lugs 21 and 22 have strut portions 73 and 74, which extend all the way to the bottom of the grooves 47 and 48 and axially beyond the surface 53, which surface includes the outer surfaces of the lips 60 and 61. Projecting radially outwardly from the struts 73 and 74 are lug lips 75 and 76, respectively, which define slots 78 and 79, respectively.

As was stated before, the Storz couplings 16 and 17 are sexless, or in other words identical, with second coupling member 17 having lugs 20 and 21 identical to those of the first coupling member 16 and grooves 47 and 48, also identically configured. Upon bringing the first and second coupling members 16 and 17 of the Storz coupling 14, together, the lugs 20 and 21 of one coupling are received in the recesses 62 and 63 of the other coupling. The second coupling member 17, which is rotatably mounted on the hose 13 in a convention manner, is then rotated in the clockwise direction with respect to the first coupling member 16, as shown in these drawings. The outer surfaces of the lips 76 engage the ramps 60 and 61 so as to be cammed toward the bottom of the slots 47 and 48 as the second coupling number 17 rotates. As the second coupling member 17 rotates, the first and second coupling members are drawn together in the axial direction, abutting the surfaces 60 and 61 on each of the coupling members. Typically, each of the coupling members 16 and 17 would have an annular rubber gasket therein. However, coupling member 16, being semi-permanently attached to the fire hydrant and subject to a variety of environmental conditions and repeated wear, would necessitate high maintenance in the form of continued gasket replacement. Consequently, the invention would incorporate a solid machine surface 80 to mate with a rubber gasket positioned in an identical location within coupling member 17. The machined surface 80 of coupling member 16 is positioned so as to initially extend slightly above the outer planar surface 53, defined by the outer surfaces of lips 60 and 61. Consequently, as the first and second coupling members 16 and 17 are drawn together, the gasket and machined surface 80 are pressed into abutment and form a water-tight seal between the coupling members.

The butterfly valve 23 consists of flaps 24 and 25, pivoted on a pintel 83 or normally biased by coil springs 84 to the closed position against an internal rim 86. The butterfly valve 23 prevents access to the interior of the fire hydrant 10, but opens to allow water under pressure within the hydrant 10 to flow therethrough. In other words, the flaps 24 and 25 of the butterfly valve 23 open outwardly with respect to FIGS. 1 and 3 in the direction of arrows 90 when the hydrant 10 is pressurized with water.

Figure 5:
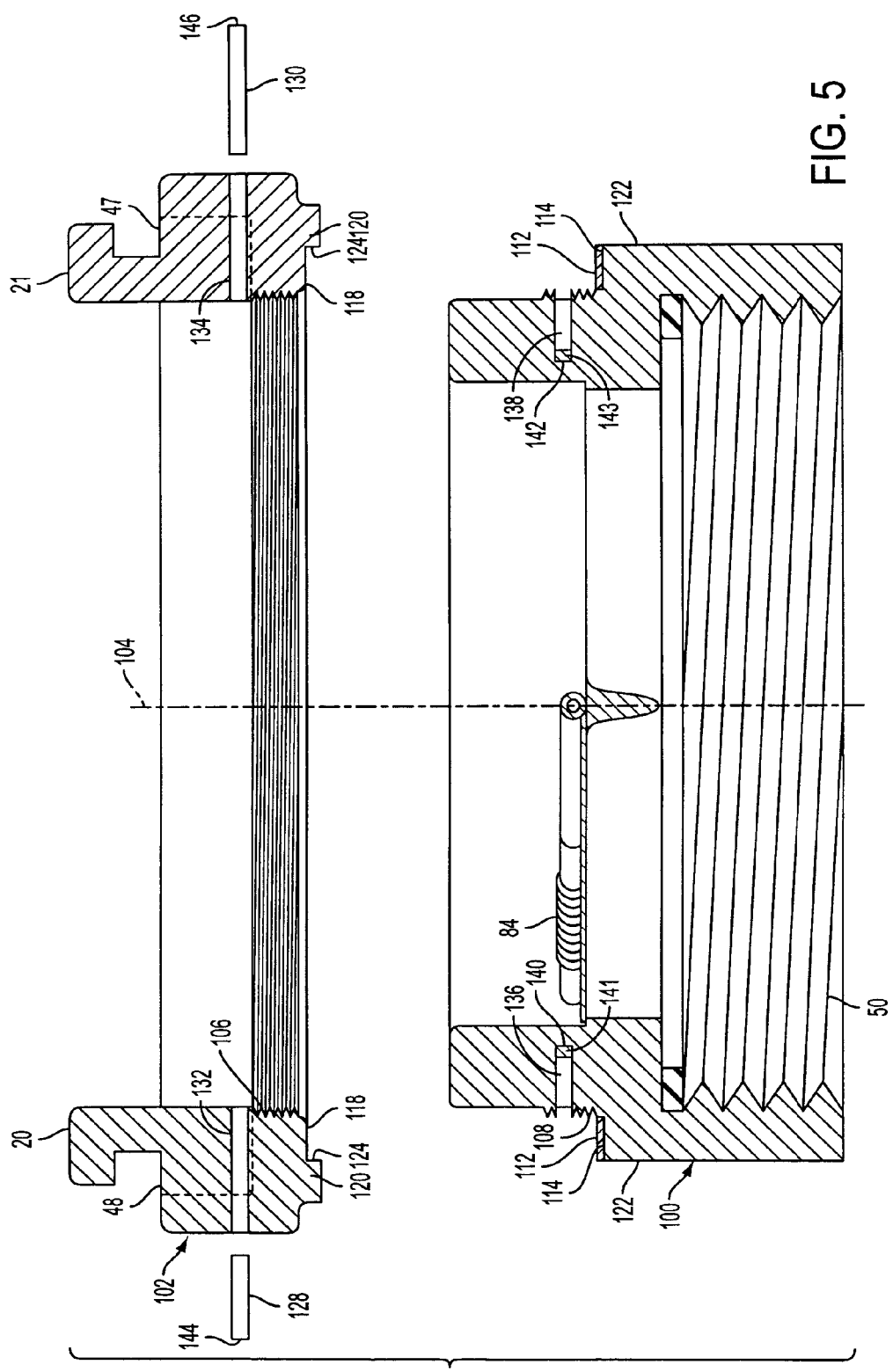
FIG. 5 is an exploded view of internally threaded collar and an external ring comprising the sexless coupling.
Figure 6:
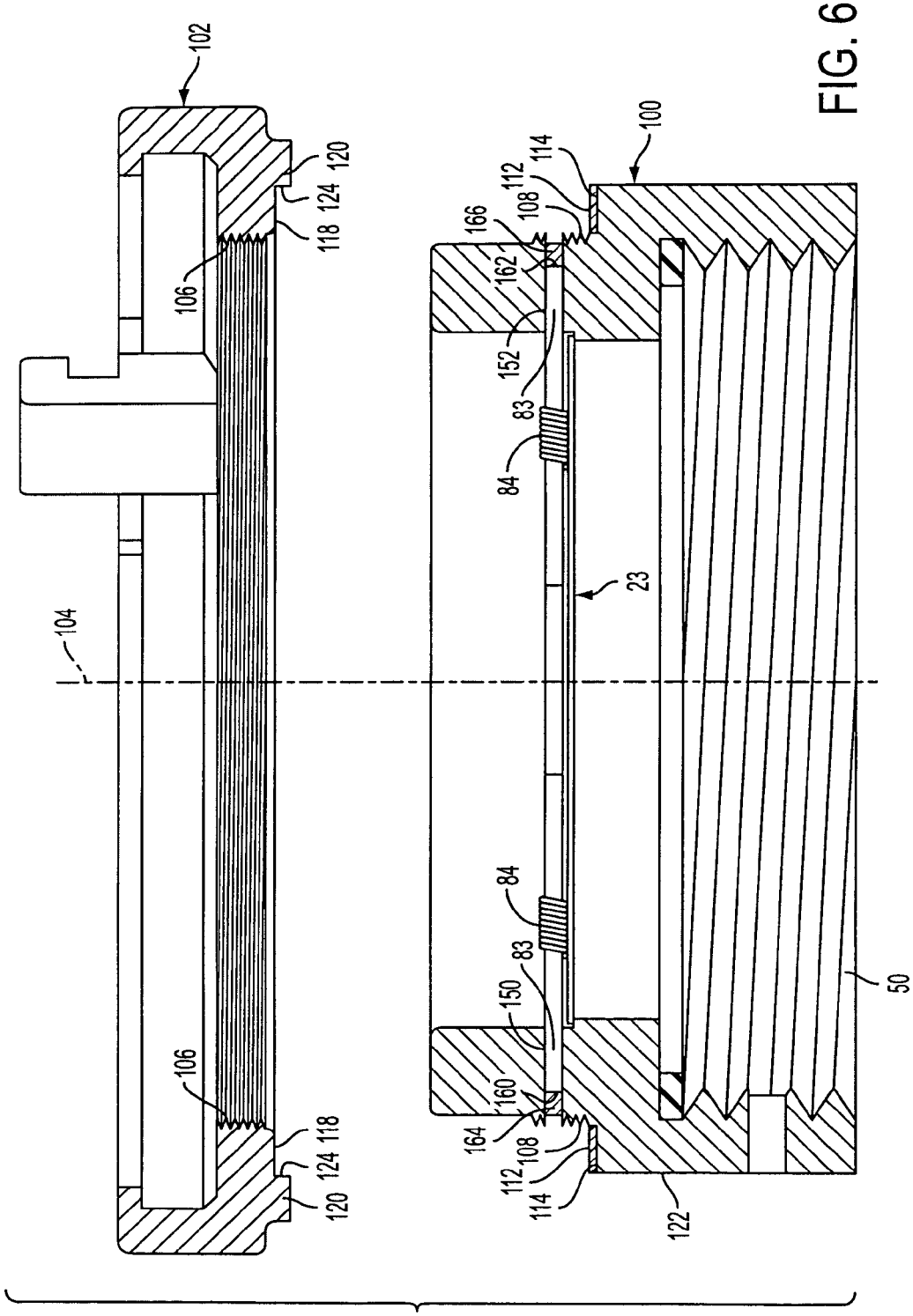
FIG. 6 is an exploded elevational view of an internally threaded collar and internal ring of the coupling of FIGS. 2–5 but taken at an angle displaced from the view of FIG. 5.

This is evident from FIGS. 4, 5 and 6 the coupling member 16 has a first collar portion 100 and a second collar portion 102 disposed about an axis 104. The second collar portion 102 has an internal helical thread 106 thereon for threading the second column 102 onto external threads 108 of the first collar portion 100 in order to make an assembly comprising the coupling member 16 shown in FIG. 4.

If the hydrant 10 of FIG. 1 is very highly pressurized, such as when located in mountainous areas where water sources may be at very high locations, a 400 psi pressure standard has been established. New Storz connectors 10 are required to meet that standard. At such pressures, small leaks can result in water streams of very high pressures that present safety hazards. It is therefore necessary to isolate the environment around the Storz connector 10, from the high pressure environment within the Storz connector. A source of possible leaks occurs between the threads 108 and 106 of the first and second collar portions 100 and 102, respectively. In order to minimize the possibility of such leaks, a layer of compressible sealant 112 preferably made of neoprene rubber is disposed in a first shoulder 114 on the first collar portion 100 and a second shoulder 118 on the second collar portions 102. The sealant 112 is compressed between the first and second shoulders 114 and 118 and retained by annular lip 120 which extends over and engages an exterior surface 122 on the first a portion 100 with axially extending shoulder 124. As the second collar portion 102 is threaded onto the first collar portion 100, the seal 112 is compressed because it can not expand radially due to a dam created by the surface 124 of the lip 120. Water under pressure between the threads 106 and 108 and the inside of the Storz connector simply further compresses the seal 112 by urging the seal radially within the collar and axially against the shoulders 116 and 118.

As is seen in FIGS. 4 and 5, the second collar portion 102 is locked against rotation with respect to the first collar portion 100 by at least one, and preferably two, split pins 128 and 130. The split pins 128 and 130 are received in through bores 132 and 134 that are aligned with blind bores 136 and 138 in the first collar portion 100. Blind bores 136 and 138 have bottoms 140 and 142 in the interior of the collar portion 100, so that there is no communication between the interior of the coupling member 16 and the threads 106 and 108. Preferably, there are aluminum epoxy sealing plugs 141 and 143 seated against the bottom 140 and 142, respectively of the bores 136 and 138 respectively. The split pins 128 and 130 have a high tolerance compression fit with the bores 132 and 134 and in accordance with an additional embodiment are sealed at their outer ends 144 and 146 with 2 part aluminum epoxy filler 148 and 150 (FIG. 4).

As is evident from FIGS. 2–5, through bores 132 and 134 are aligned with the locking lugs 20 and 21 so that there is substantial metal mass at the location of the split pins 128 and 130. Moreover, as is seen in FIGS. 4 and 5, the bores 132 and 134 through the second collar portion 102 and bores 136 and 138 through the first collar portion 100 are also positioned to extend through the threaded portions 106 and 108 and the collar portions.

Referring now to FIGS. 3 and 6, it is seen that the pintles 83 that support the flaps 25 and 26 of the flapper valve 23 is received in bores 150 and 152 through the first collar portion 100. The bores 150 and 152 are aligned with the internal thread 108 on the first collar portion 100 and the internal thread 106 on the second collar portion 102. Bores 150 and 152. The pintle 83 has a high tolerance fit in the bores 150 and 152 in order to minimize the possibility of leakage from the interior of the interior coupling member 16 to the exterior thereof.

In order to seal the ends 160 and 162 of the pintle 83, two-part aluminum epoxy filler is deposited in the bores 150 and 152 out to the thread 108 of the second collar portion 102 to form plug seals 164 and 166. Any water that migrates or is forced between the bores 150 and 152 and the pintle 83 is stopped by the plugs 164 and 166 which fills possible small voids in the walls of the bores.

Figure 7:
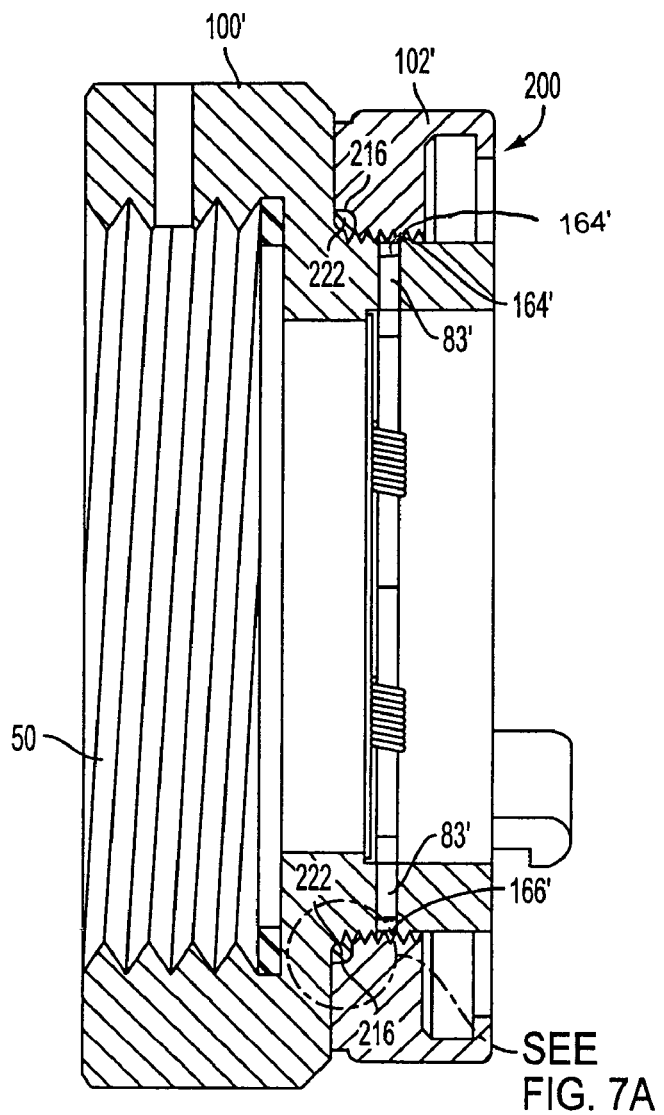
FIG. 7 is an elevation of a second embodiment of the sexless coupling used with the outlet of the fire hydrant of FIG. 1.
Figure 8:
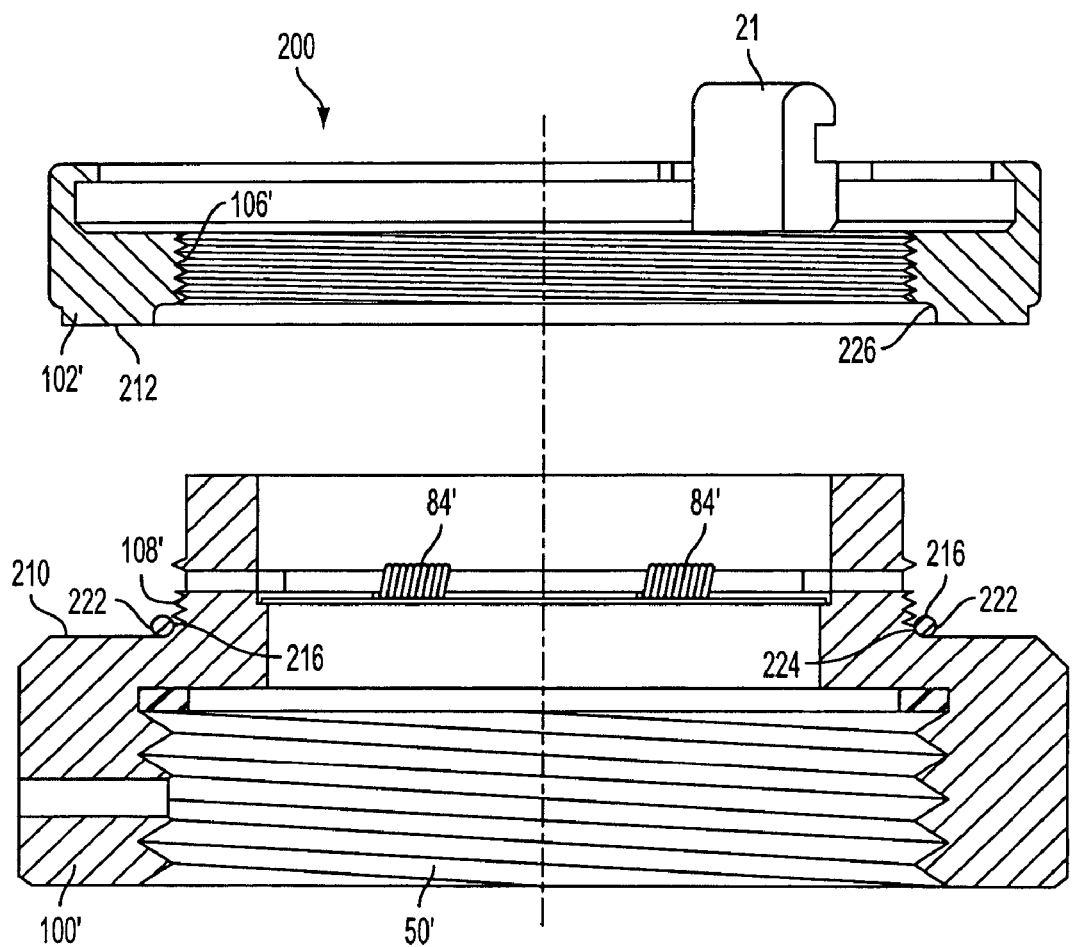
FIG. 8 is an exploded elevational view of an internally threaded collar and internal ring of the coupling of FIG. 7.

Referring now to FIGS. 7 and 8 where a second embodiment 200 of the first coupling member is shown, it is seen that the first coupling member 200, like the first coupling member 16 of FIGS. 4–6, has an internally threaded collar 50' which is screwed onto the neck 11 of the fire hydrant 10 of FIG. 1. The coupling member 200 has structures similar to the first embodiment 16, except that the second embodiment 200 has a diameter of 4 inches to thread onto a 4 inch threaded portion of the fire hydrant neck 11 instead of a diameter of 5 inches to thread onto a 5 inch threaded portion of the fire hydrant neck.

Figure 7A:
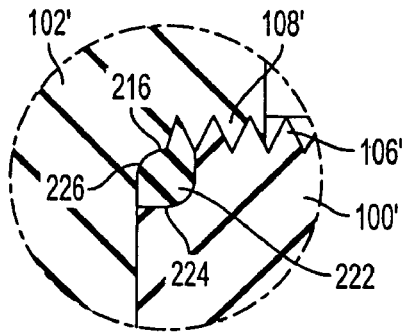

The first coupling member 200 of FIGS. 7, 7A and 8 also uses split pins, similar to split pins 128 and 130 (see FIGS. 4 and 5) to fix the first collar portion 100' to the second collar portion 102'. In addition, in the first coupling member 200, blind bores, similar to the blind bores 136 and 138 of FIG. 5 located in the first collar portion 100', have aluminum epoxy sealing plugs like the aluminum epoxy sealing plugs 141 and 143 of FIG. 5 to seal the ends of the split pins 128 and 130.

In the second embodiment 200 the first collar portion 100' has an annular flat surface 210 which is abutted by an annular flat surface 212 on the second collar portion 102' when the collar portions 100' and 102' are threaded together by the threads 108' and 106'. As best seen in FIG. 7A, there is a small annular space 216 provided in the second collar portion 102' which is enclosed when the second collar portion 102' is advanced down over the first collar portion 100'. The space 216 is located between an annular corner 224, where the flat surface 210 of the first collar portion 100' and the thread 108' meet, and the annular edge 226, where the flat surface 212 of the second collar portion and the thread 106' meet. The annular space 216 is filled with a sealing material 222, which is preferably neoprene rubber that is compressed in the space 216 as the first and second collar portions are threaded together. In the second embodiment 200, the flat surfaces 210 and 212 directly abut so that the sealing material 222 does not extend between the flat surfaces 210 and 212. The sealing material 222 prevents water under high pressure, up to 400 lbs/in$^2$, from escaping at high velocity between the abutting flat surfaces 210 and 212 and possibly injuring firemen or bystanders.

From the foregoing description, one skilled in the art can easily ascertain the essential characteristics of this invention, and without departing form the spirit and scope thereof, can make various changes and modifications of the invention to adapt it to various usages and conditions.

I claim:

1. A sexless coupling member for connecting a fire hose to a fire hydrant or another pressurized source of water on a pumper truck, comprising:

an internally threaded collar portion disposed about an axis and having an internally threaded section and an externally threaded section, the internally threaded section being adapted to receive an externally threaded neck of a fire hydrant outlet or a pumper truck outlet;

a flapper valve support portion at the end of the internally threaded collar portion, the valve support portion having a radially extending annular surface facing the first end of the internally threaded collar portion and having an opening therethrough;

a gasket seated against the radially extending annular surface and adapted to seal with the externally threaded neck of the fire hydrant outlet or pumper truck outlet;

a flapper valve supported on a pintle extending across the opening through the radially extending annular surface;

the flapper valve support portion having an internal ring portion with an external thread unitary with the internally threaded collar portion and aligned with the opening through the radially extending annular surface, the internal ring port having a first radial shoulder extending radially outward from the external thread, and the internal ring portion having a pair of opposed pintle holes therein for receiving the pintle which supports the flapper valve, the pintle holes intersecting the external thread and being closed by unthreaded plugs adjacent to the external thread to prevent water passing around the pintle from passing through the pintle holes to locations beyond the external thread;

an external ring having a lower portion with an internal thread for threading with the external thread of the internal ring portion to hold the external ring in integral relation with the internal ring portion, the external ring having a second radial shoulder extending radially outward from the internal thread, and the externally threaded ring portion having at least one blind bore extending for receiving a locking pin when aligned with the at least one blind bore in the internal ring portion to prevent rotation of the external ring with respect to the internal ring portion after threading the external ring onto the internal ring portion, the at least one blind bore having a bottom with an insert of sealing material therein, which insert prevents pressurized water within the coupling from escaping therefrom through the external ring; the internal thread of the external ring overlying the unthreaded plugs fri the pintle holes to positively retain the unthreaded plugs in place; and hooked lugs extending axially from the external ring and arcuate grooves disposed between the internal ring portion and external rings, the hooked lugs and arcuate grooves being adapted to cooperate with a complementary sexless coupling on a hose.

2. The sexless coupling of claim 1 wherein an annular seal, adiacent to the external thread on the internal ring portion and the internal thread on the external ring portion, extends radially outwardly of the external and internal threads and being compressed between for sealing between the threads of the internal ring portion and the threads of the external ring only at the iuncture of the threads.

3. The sexless coupling of claim 1 wherein a radially extending seal adjacent to the external thread on the internal ring portion, is engaged by the external ring adjacent to the internal thread thereon for sealing between the internal ring portion and external ring.

4. The sexless coupling of claim 1 wherein the annular seal is made of neoprene rubber.

5. The sexless coupling of claim 4 wherein the coupling further comprises a stiffener extending across the opening upstream of and aligned with the pintle.

6. The sexless coupling of claim 5 wherein the coupling further includes a second blind bore in the internal ring and a second through bore in the external ring aligned with the second blind bore in the internal ring for receiving a second locking pin.

7. The sexless coupling of claim 6 wherein the blind and through bores are in alignment with the locations of the projecting hooks extending from the external ring.

8. The sexless coupling of claim 7 wherein the coupling is made of steel or aluminum.

9. The sexless coupling of claim 8 wherein the insert of sealing material in the blind bore and the unthreaded plugs in the pintle holes are made of aluminum epoxy.

10. The sexless coupling of claim 1 wherein the insert of sealing material in the blind bore and the unthreaded plugs in the pintle holes are made of aluminum epoxy.

* * * * *

UNITED STATES PATENT AND TRADEMARK OFFICE
CERTIFICATE OF CORRECTION

PATENT NO. : 7,128,091 B2
APPLICATION NO. : 10/669331
DATED : October 31, 2006
INVENTOR(S) : Roy Istre It is certified that error appears in the above-identified patent and that said Letters Patent is hereby corrected as shown below:

Column 7, line 17 reads "port" should read -- portion --
Column 7, line 42 reads "fri" should read -- in --
Column 8, line 7 reads "adiacent" should read -- adjacent --
Column 8, line 13 reads "iuncture" should read --juncture --

Signed and Sealed this

Third Day of July, 2007

JON W. DUDAS
*Director of the United States Patent and Trademark Office*